(12) United States Patent
Binek

(10) Patent No.: US 10,941,944 B2
(45) Date of Patent: Mar. 9, 2021

(54) CONSUMABLE SUPPORT STRUCTURES FOR ADDITIVELY MANUFACTURED COMBUSTOR COMPONENTS

(71) Applicant: UNITED TECHNOLOGIES CORPORATION, Farmington, CT (US)

(72) Inventor: Lawrence Binek, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 163 days.

(21) Appl. No.: 16/152,136

(22) Filed: Oct. 4, 2018

(65) Prior Publication Data

US 2020/0109859 A1  Apr. 9, 2020

(51) Int. Cl.
| | |
|---|---|
| *F23R 3/60* | (2006.01) |
| *F23R 3/28* | (2006.01) |
| *F23R 3/00* | (2006.01) |
| *F02K 3/06* | (2006.01) |
| *F23R 3/34* | (2006.01) |

(52) U.S. Cl.
CPC ............ *F23R 3/60* (2013.01); *F23R 3/002* (2013.01); *F23R 3/283* (2013.01); *F02K 3/06* (2013.01); *F05D 2240/35* (2013.01); *F23R 3/34* (2013.01); *F23R 2900/00018* (2013.01)

(58) Field of Classification Search
CPC .... F23R 3/002; F23R 3/12; F23R 3/16; F23R 3/20; F23R 3/283; F23R 3/34; F23R 3/60; F23R 2900/00017–00018; F23R 3/286; F05D 2230/20; F05D 2230/22; F05D 2230/30; F05D 2230/31; F05D 2230/311–2230/314; F05D 2230/64; F05D 2230/642; F05D 2230/68
See application file for complete search history.

(56) References Cited

U.S. PATENT DOCUMENTS

| | | | | |
|---|---|---|---|---|
| 5,850,732 | A * | 12/1998 | Willis | F23R 3/02 60/804 |
| 9,597,730 | B2 | 3/2017 | Mironets et al. | |
| 2004/0219290 | A1* | 11/2004 | Nagaraj | C23C 28/3215 427/140 |

(Continued)

FOREIGN PATENT DOCUMENTS

| | | |
|---|---|---|
| EP | 3115691 | 1/2017 |
| WO | 2018013178 | 1/2018 |
| WO | 2018026382 | 2/2018 |

OTHER PUBLICATIONS

European Patent Office, European Search Report dated Feb. 13, 2020 in Application No. 19201320.9.

*Primary Examiner* — Andrew H Nguyen
(74) *Attorney, Agent, or Firm* — Snell & Wilmer L.L.P.

(57) ABSTRACT

An additively manufactured combustor shell may comprise a radially outward surface, a radially inward surface opposite the radially outward surface, and an injector port defining a fuel injection channel. The injector port may comprise an inlet structure extending from the radially outward surface, and an outlet structure may extending from the radially inward surface. A support structure may extend between the outlet structure and the radially inward surface. The support structure may be configured to vaporize upon ignition of a fuel within the combustion chamber.

19 Claims, 5 Drawing Sheets

(56) References Cited

U.S. PATENT DOCUMENTS

| | | |
|---|---|---|
| 2011/0289928 A1 | 12/2011 | Fox et al. |
| 2014/0255167 A1* | 9/2014 | Stevens .................. F01D 25/00 |
| | | 415/173.3 |
| 2015/0260402 A1 | 9/2015 | Bagchi |
| 2015/0323183 A1* | 11/2015 | Butcher ................ F01D 25/243 |
| | | 60/752 |
| 2016/0003556 A1* | 1/2016 | Ott .......................... F23R 3/283 |
| | | 165/177 |
| 2016/0236271 A1* | 8/2016 | Xu .......................... B22C 9/103 |
| 2017/0015944 A1 | 1/2017 | Dkidak et al. |
| 2019/0178497 A1* | 6/2019 | Jones ...................... F23R 3/002 |
| 2019/0375006 A1* | 12/2019 | Barua ..................... B22F 5/007 |
| 2020/0025379 A1* | 1/2020 | Jones ........................ F23R 3/06 |

\* cited by examiner

CONSUMABLE SUPPORT STRUCTURES FOR ADDITIVELY MANUFACTURED COMBUSTOR COMPONENTS

FIELD

The present disclosure relates to additive manufacturing, and, more specifically, to consumable support structure for additively manufactured combustor components.

BACKGROUND

A gas turbine engine includes a fan section, a compressor section, a combustor section, and a turbine section. The fan section may drive air along a bypass flowpath while the compressor section may drive air along a core flowpath. In general, during operation, air is pressurized in the compressor section and then mixed with fuel and ignited in the combustor section to generate combustion gases. The combustion gases flow through the turbine section, which extracts energy from the combustion gases to power the compressor section and generate thrust.

Additive manufacturing may be employed to form various components of a gas turbine engine. Forming components of the combustor, which have complex geometries and overhanging portions, may require the use of additively manufactured support structures. The support structures add mass to the engine and affect flow patterns through the combustion chamber which may decrease engine efficiency and performance.

SUMMARY

An additively manufactured combustor shell is disclosed herein. In accordance with various embodiments, the additively manufactured combustor shell may comprise a radially outward surface, a radially inward surface opposite the radially outward surface, and an injector port defining a fuel injection channel. The injector port may comprise an inlet structure extending from the radially outward surface, an outlet structure extending from the radially inward surface, and a support structure extending between the outlet structure and the radially inward surface. The support structure may be configured to vaporize at a temperature of 2000° Fahrenheit.

In various embodiments, the outlet structure of the injector port may comprise a first wall including a first exterior surface oriented away from the fuel injection channel and a first interior surface oriented toward the fuel injection channel. The first exterior surface may be oriented at an angle of between 35° and 90° relative to the radially inward surface of the additively manufactured combustor shell.

In various embodiments, the outlet structure of the injector port may further comprise a second wall located at an end of the first wall. The second wall may include a second exterior surface oriented away from the fuel injection channel and a second interior surface oriented toward the fuel injection channel. The second exterior surface may be oriented at an angle of between 35° and 90° relative to the radially inward surface of the combustor shell.

In various embodiments, the support structure may be located at the end of the first wall. The second wall may be oriented at an angle of approximately 90° relative to the first wall. In various embodiments, the outlet structure of the injector port may further comprise a third wall extending from the first wall to the second wall. The third wall may comprise a curved exterior surface.

In various embodiments, a thickness of the support structure may be less than 20% of a thickness of the first wall.

A combustor is also disclosed herein. In accordance with various embodiments, the combustor may comprise an inner combustor shell, an outer combustor shell radially outward of the inner combustor shell, and an injector port defining a fuel injection channel through the outer combustor shell. The injector port may comprise an outlet structure extending from a radially inward surface of the outer combustor shell, and a support structure extending between the outlet structure and the radially inward surface.

In various embodiments, the outlet structure of the injector port may comprise a first wall including a first exterior surface oriented away from the fuel injection channel and a first interior surface oriented toward the fuel injection channel. The first exterior surface may be oriented at an angle of between 35° and 90° relative to the radially inward surface of the outer combustor shell.

In various embodiments, the support structure may be configured to vaporize at a temperature of 2000° F. In various embodiments, a thickness of the support structure may be less than 20% of a thickness of the first wall.

In various embodiments, the outlet structure of the injector port may further comprise a second wall extending from an end of the first wall. The second wall may include a second exterior surface oriented away from the fuel injection channel and a second interior surface oriented toward the fuel injection channel. The second exterior surface may be oriented at an angle of between 35° and 90° relative to the radially inward surface of the outer combustor shell.

In various embodiments, the support structure may be located along an edge of the injector port formed by the first wall and the second wall. The support structure may comprise a triangular cross-section having a first height at an outlet end of the of the outlet structure and a second height less than the first height at an inlet end of the outlet structure.

In various embodiments, the outlet structure of the injector port may further comprise a third wall extending from the first wall to the second wall. The third wall may comprise a curved exterior surface.

A method of making a combustor is also disclosed herein. In accordance with various embodiments, the method may comprise the steps of forming a combustor shell using additive manufacturing, forming a support structure extending from an interior shell surface of the combustor shell using additive manufacturing, forming an injector port over the support structure using additive manufacturing, and removing the support structure by igniting a fuel in a combustion chamber defined by the combustor shell.

In various embodiments, forming the injector port may comprise forming a first wall of the injector port at an angle of between 35° and 90° relative to the interior shell surface of the combustor shell. In various embodiments, a thickness of the support structure is less than 20% of a thickness of the first wall.

In various embodiments, forming the injector port may further comprise forming a second wall of the injector port at an angle of between 35° and 90° relative to the interior shell surface of the combustor shell. In various embodiments, the support structure may be located at an edge of the injector port formed by the first wall and the second wall.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
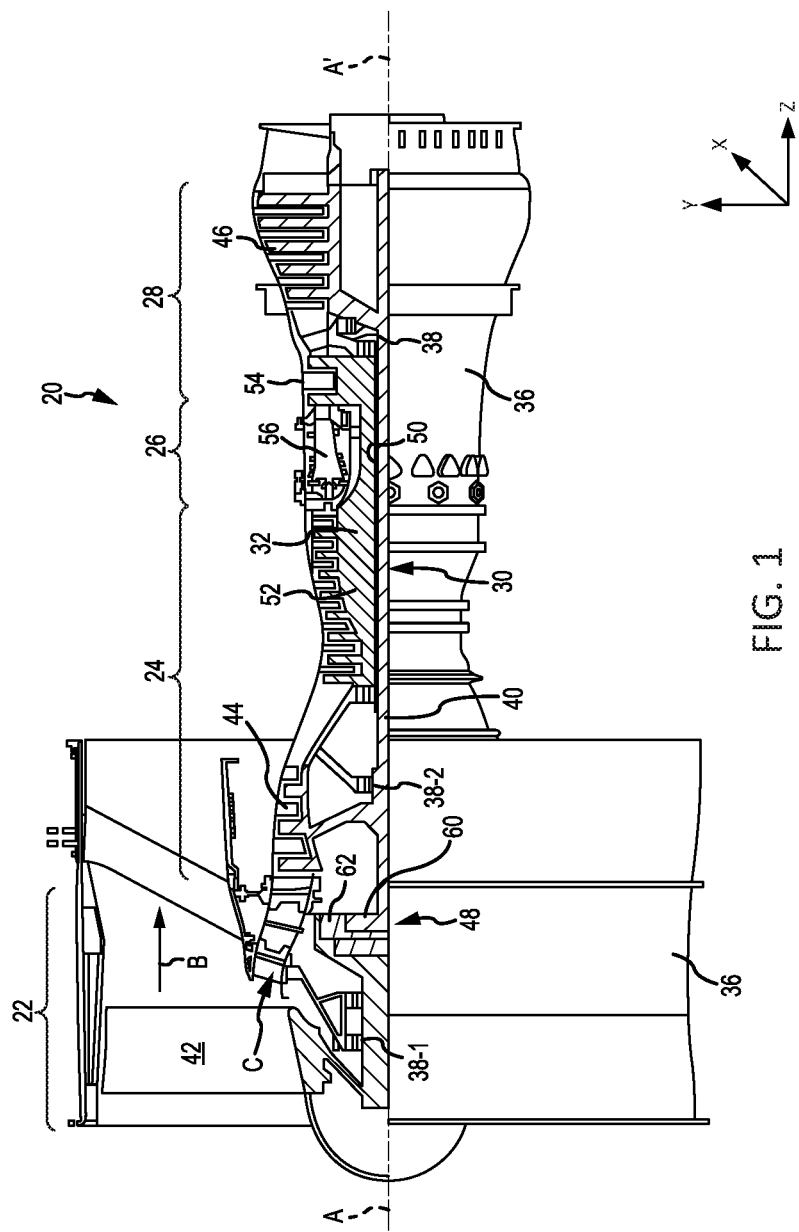
FIG. 1 illustrates a cross-sectional view of an exemplary gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "proximate" refers to a direction towards, or generally closer to, a reference component. As used herein, "distal" refers to a direction away from, or generally a greater distance apart from, a reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, lathing, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

With reference to FIG. 1, a gas turbine engine 20 is provided, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 generally comprises a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine section 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow in core flowpath C may be compressed by low pressure compressor 44 then high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

Figure 2:
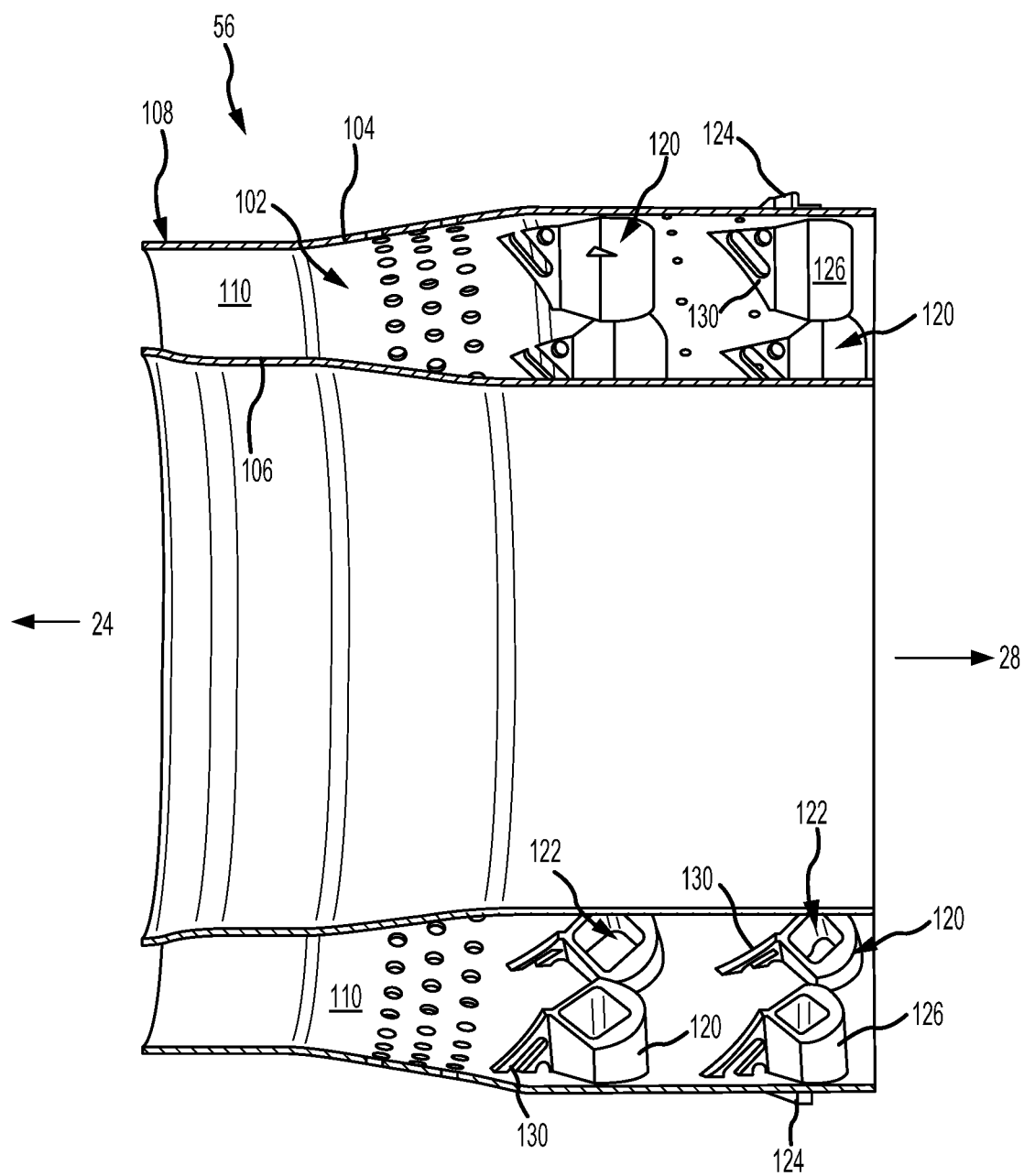
FIG. 2 illustrates a cross-sectional view of an additively manufactured combustor having a plurality of injector ports, in accordance with various embodiments.

FIG. 2 shows an exemplary cross-section of combustor 56 positioned between compressor section 24 and turbine section 28 of gas turbine engine 20. Combustor 56 includes a combustion chamber 102 defined by an outer combustor shell 104 and an inner combustor shell 106. Inner Combustor shell 106 may be radially inward of outer combustor shell 104. Outer combustor shell 104 and inner combustor shell 106 may provide structural support to combustor 56 and its components. In various embodiments, outer combustor shell 104 and inner combustor shell 106 may comprise substantially cylindrical or substantially conical canister portions defining combustion chamber 102. Combustion chamber 102 may form a region for mixing of air flowing through core flow-path C and fuel. Combustion chamber 102 may be configured to direct the high-speed exhaust gases produced by ignition of the fuel air mixture inside combustion chamber 102. The high-speed exhaust gases may be driven downstream within combustor 56 towards and output to turbine section 28.

Outer combustor shell 104 and inner combustor shell 106 may be made of any suitable heat tolerant material. In this manner, outer combustor shell 104 and inner combustor shell 106 may be substantially resistant to thermal mechanical fatigue in order to inhibit cracking of combustor shells. In various embodiments, outer combustor shell 104 and inner combustor shell 106 may be made from a nickel-based super alloy.

In various embodiments, one or more components of combustor 56 may be formed using additive manufacturing. For example, outer combustor shell 104 and inner combustor shell 106 may be formed using additive manufacturing, for example, using laser-based powder bed fusion.

In accordance with various embodiments, outer combustor shell 104 may include one or more additively manufacture injector ports 120. Injector ports may be configured to deliver a fuel and/or a fuel air mixture into combustion chamber 102. In this regard, each injector port 120 defines a fuel injection channel 122 extending from a radially outward, or exterior shell, surface 108 of outer combustor shell 104 to a radially inward, or interior shell, surface 110 of outer combustor shell 104. As used herein, an "interior shell surface" refers to a surface of a combustor shell that is oriented generally toward combustion chamber 102, and an "exterior shell surface" refers to a surface of a combustor shell that is oriented generally away from combustion chamber 102.

Injector ports 120 may be oriented at various angles relative to interior shell surface 110. The orientation of each injector port 120 may be selected to promote swirling and/or other directional components of the combustion gases flowing around and through combustion chamber 102.

Figure 3A:
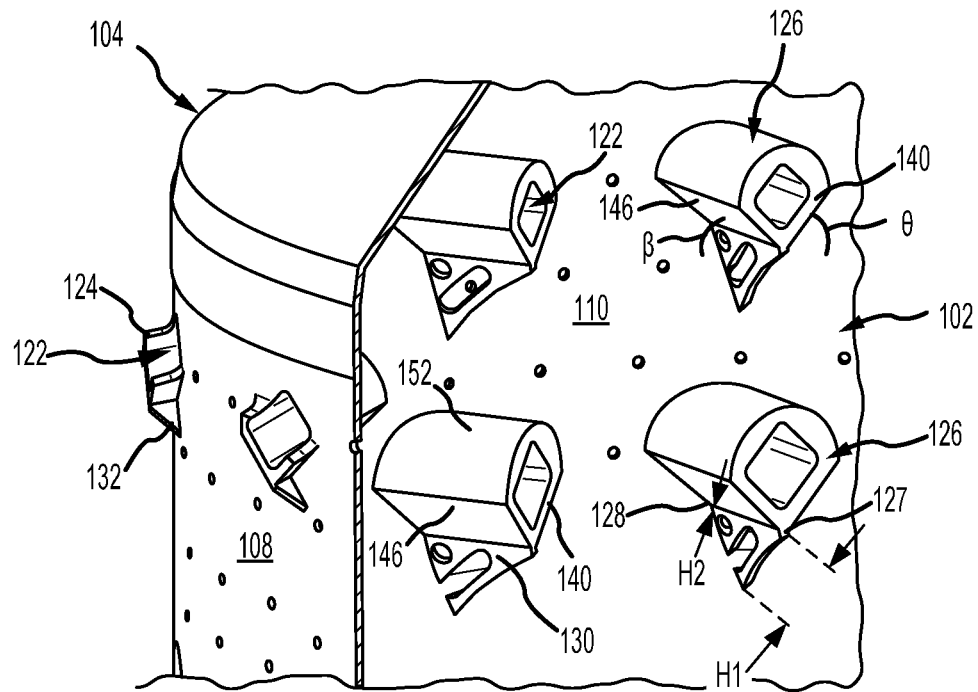
FIG. 3A illustrates a perspective view of additively manufactured injector ports with consumable support structures, in accordance with various embodiments.

Referring to FIG. 3A, and with continued reference to FIG. 2, in accordance various embodiments, each injector port 120 may include an inlet structure 124 extending from exterior shell surface 108 and an outlet structure 126 extending from interior shell surface 110. Fuel and/or a fuel air mixture may be received at inlet structure 124 and output into combustion chamber 102 at outlet structure 126. In accordance various embodiments, one or more support structures 130 may be formed, using additive manufacturing, between interior shell surface 110 and outlet structure 126 of injector ports 120. Support structures 130 may be formed to support formation of outlet structure 126 at various angles relative to interior shell surface 110. Stated differently, to form injector ports 120 having the desired geometry and/or at the desired angle relative to interior shell surface 110 one or more support structures 130 may be formed extending from interior shell surface 110 to support the deposition of the material (e.g., metal or metal alloy) of outlet structure 126.

In various embodiments, support structures 130 may have a generally triangular cross-section. For example, a first height H1 of the support structure 130 (as measured from interior shell surface 110 to outlet structure 126) at an outlet end 127 of outlet structure 126 is greater than a second height H2 of the support structure 130 at an inlet end 128 of outlet structure 126. Inlet end 128 of outlet structure 126 is located proximate, or directly adjacent, to interior shell surface 110. Outlet end 127 of outlet structure 126 is located distal to interior shell surface 110 and generally opposite inlet end 128.

In various embodiments, one or more support structures 132 may be formed, using additive manufacturing, between exterior shell surface 108 and inlet structures 124 of injector ports 120. Support structures 132 may be formed to support formation of inlet structure 124 at various angles relative to exterior shell surface 108. Stated differently, to form injector ports 120 having the desired geometry and/or at the desired angle relative to exterior shell surface 108 one or more support structures 132 may be formed extending from exterior shell surface 108 to support the deposition of the material (e.g., metal or metal alloy) of inlet structure 124.

Inlet structures 124, outlet structures 126, and support structures 130, 132 are formed using additive manufacturing, for example using laser-based powder bed fusion. Inlet structures 124, outlet structures 126, and support structures 130, 132 may be formed from an additively manufactured metal or metal alloy. For example, inlet structures 124, outlet structures 126, and support structures 130, 132 may comprise an additively manufactured nickel-based super alloy, titanium alloy, or any other metal or metal alloy that may be additively manufactured.

Figure 4:
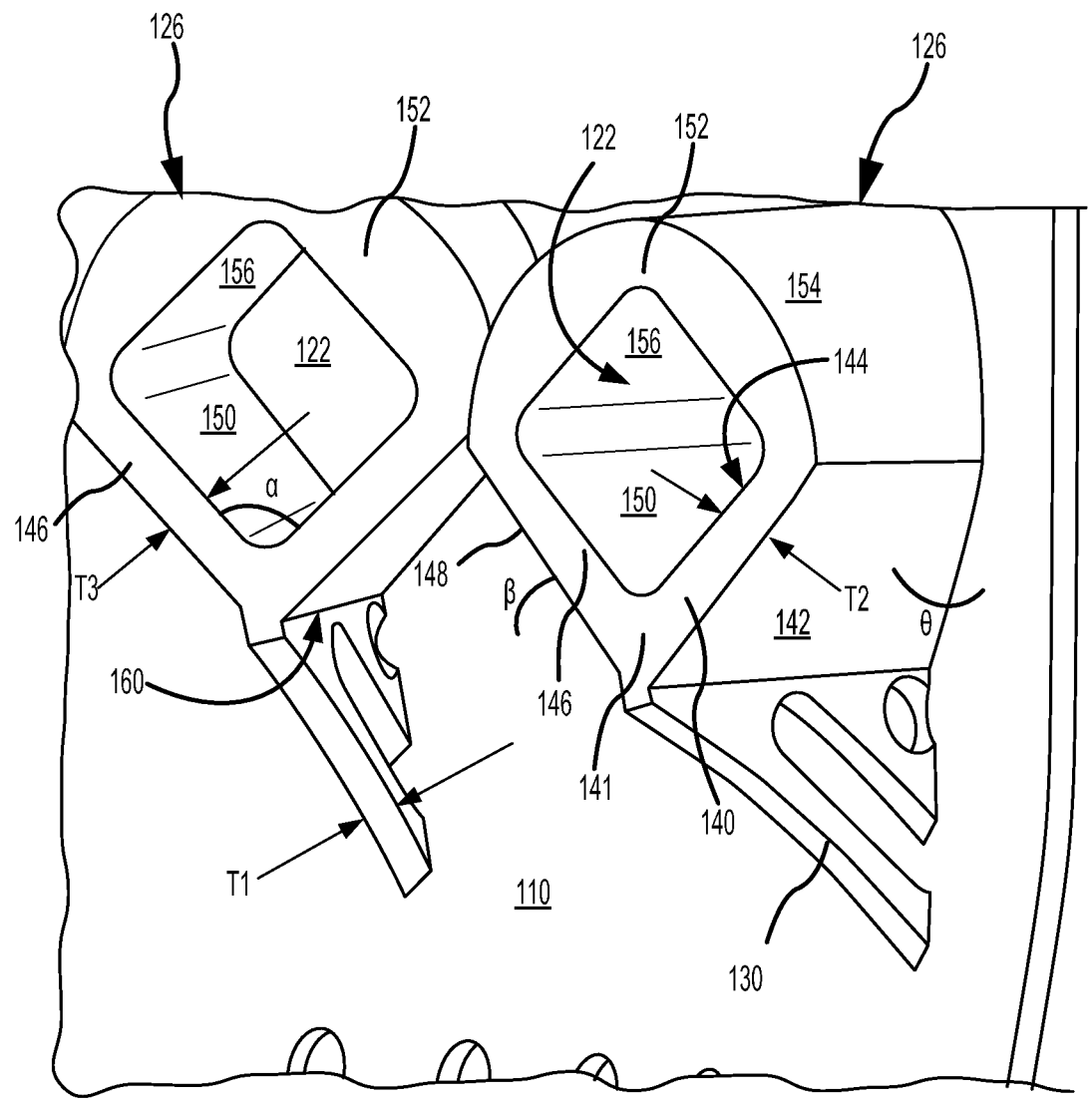
FIG. 4 illustrates a perspective view of injector port outlet structures, in accordance with various embodiments.

Referring now to FIG. 4, and with continued reference to FIG. 3A, additional details of outlet structure 126 are illustrated, in accordance with various embodiments. Outlet structures 126 may each include a first wall 140 having an exterior surface 142 oriented away from fuel injection channel 122 and an interior surface 144 oriented toward fuel injection channel 122. First wall 140 and interior shell surface 110 may form an angle theta (θ). Stated differently, exterior surface 142 of first wall 140 may be oriented at an angle theta θ relative to interior shell surface 110. In various embodiments, angle theta θ may be 35° or greater. In various embodiments, angle theta θ may be between 35° and 90°. In various embodiments, angle theta θ may be between 45° and 90°. Support structures 130 may support formation of first wall 140 at angle theta θ.

Outlet structures 126 may each further include a second wall 146 having an exterior surface 148 oriented away from fuel injection channel 122 and an interior surface 150 oriented toward fuel injection channel 122. Second wall 146 may extend from a first end 141 of first wall 140, such that second wall 146 and first wall 140 form an edge 160 of outlet structure 126. Support structure 130 may be located proximate first end 141 of first wall 140. In this regard, support structure 130 may be formed along the edge 160 formed by first wall 140 and second wall 146. Second wall 146 may be oriented at an alpha (α) relative to first wall 140. In various embodiments, angle alpha α may be approximately 90°. As used in the previous context only, "approximately" means ±5°. Second wall 146 and interior shell surface 110 may form an angle beta (β). Stated differently, exterior surface 148 of second wall 146 may be oriented at an angle beta β relative to interior shell surface 110. In various embodiments, angle beta β may be 35° or greater. In various embodiments, angle beta β may be between 35° and 90°. In various embodiments, angle beta β may be between 45° and 90°. Support structures 130 may support formation of second wall 146 at angle beta β.

Outlet structures 126 may each further include a third wall 152 extending between from first wall 140 to second wall 146. Third wall 152 may have an exterior surface 154 oriented away from fuel injection channel 122 and an interior surface 156 oriented toward fuel injection channel 122. In various embodiments, exterior surface 154 may be a curved surface. Interior surface 156 of third wall 152 may form a right angle such that fuel injection channel 122 comprises a rectangular cross section defined by interior surface 144 of first wall 140, interior surface 150 of second wall 146, and interior surface 156 of third wall 152.

During operation of gas turbine engine 20 (FIG. 1), a fuel air mixture is ignited in combustion chamber 102. It may be desirable for the fuel air mixture and/or the combustion gases to flow along interior shell surface 110. Support structures 130 may undesirably encumber or divert flow along interior shell surface 108. Removing support structures 130 may thus increase engine efficiency and performance.

In accordance with various embodiments, support structures 130 are configured to be consumed (i.e., removed) by the combustion gases in combustion chamber 102. For example, support structures 130 are configured to vaporize at temperatures of 2000° Fahrenheit (F) (1093° Celsius (C)) or greater. Stated differently, a thickness T1 of support structures 130 is selected such that igniting the fuel air mixture within combustion chamber 102 will create combustion gas of sufficient temperature to vaporize support structures 130. In various embodiments, thickness T1 may be 20% or less of a thickness T2 of first wall 140. In various embodiments, thickness T1 may be 15% or less of thickness T2 of first wall 140. In various embodiments, thickness T2 of first wall 140 may be 0.032 inches (0.813 millimeters (mm)) and thickness T1 of support structure may be 0.005 inches (0.127 mm). In various embodiments, thickness T1 of support structure 130 may be 20% or less than the thickness of the thinnest wall of outlet structure 126. For example, if a thickness T3 of second wall 146 is less than thickness T2 of first wall 140, thickness T1 of support structure 130 may be 20% or less than thickness T3. In various embodiments, thickness T1 of support structure 130 may be 15% or less than the thickness of the thinnest wall of outlet structure 126.

Figure 3B:
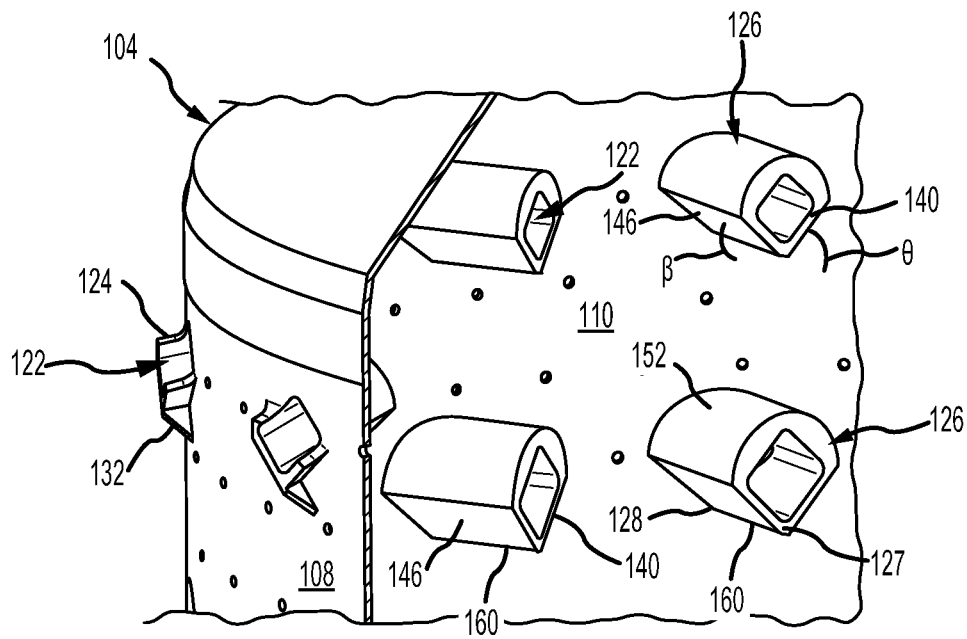
FIG. 3B illustrates a perspective view of the additively manufactured injector ports of FIG. 3A, after vaporization of the support structures, in accordance with various embodiments.

FIG. 3B shows outer combustor shell 104 after support structures 130 have been consumed, in accordance with various embodiments. With combined reference to FIG. 3B and FIG. 2, during operation of gas turbine engine 20, the fuel air mixture within combustion chamber 102 is ignited and support structures 130 are vaporized to leave outlet structures 126 extending from interior shell surface 110. Removal of support structures 130 exposes the edge 160 formed by first wall 140 and second wall 146. It is contemplated and understood that small particulates of support structures 130 may remain attached at edge 160 of outlet structures 126. Removing support structures 130 using the combustion gases within combustion chamber 102 may reduce manufacturing time, increase engine efficiency and performance, and allow for more complex injection port geometries.

Figure 5:
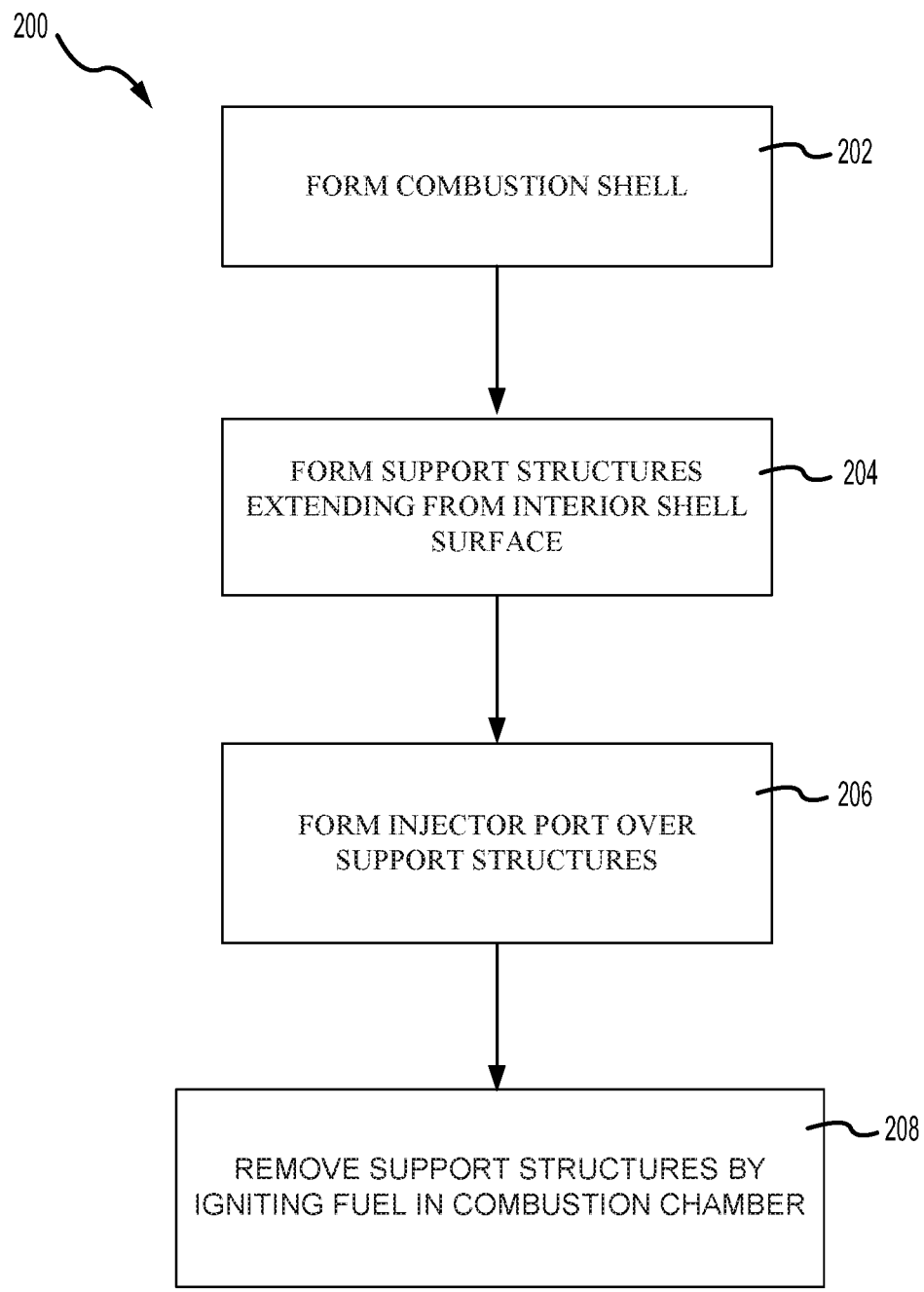
FIG. 5 illustrates a method of making combustor using consumable support structures, in accordance with various embodiments.

Referring now to FIG. 5, a method 200 of making a combustor is illustrated, in accordance with various embodiments. Method 200 may include forming a combustor shell using additive manufacturing (step 202), forming a support structure extending from an interior shell surface of the combustor shell (step 204), forming an injector port over the support structure using additive manufacturing (step 206), and removing the support structure by igniting a fuel in a combustion chamber defined by the combustor shell (step 208).

In various embodiments, step 206 may include forming a first wall of the injector port at an angle of between 35° and 90° relative to the interior shell surface of the combustor shell, and forming a second wall of the injector port at an angle of between 35° and 90° relative to the interior shell surface of the combustor shell. In various embodiments, the support structure is located at an edge of the injector port formed by the first wall and the second wall. In various embodiments, a thickness of the support structure is less than 20% of a thickness of the first wall.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An additively manufactured combustor shell, comprising:
   an exterior shell surface;
   an interior shell surface opposite the exterior shell surface, the interior shell surface defining, at least, a portion of a combustion chamber; and
   an injector port defining a fuel injection channel, the injector port comprising:
      an inlet structure extending from the exterior shell surface;
      an outlet structure extending from the interior shell surface; and
      a support structure extending between and contacting the outlet structure and the interior shell surface, wherein the support structure is configured to vaporize at a temperature of 2000° Fahrenheit.

2. The additively manufactured combustor shell of claim 1, wherein the outlet structure of the injector port comprises a first wall including a first exterior surface oriented away from the fuel injection channel and a first interior surface oriented toward the fuel injection channel, and wherein the first exterior surface is oriented at an angle of between 35° and 90° relative to the interior shell surface of the additively manufactured combustor shell.

3. The additively manufactured combustor shell of claim 2, wherein the outlet structure of the injector port further comprises a second wall located at an end of the first wall, the second wall including a second exterior surface oriented away from the fuel injection channel and a second interior surface oriented toward the fuel injection channel, and wherein the second exterior surface is oriented at an angle of between 35° and 90° relative to the interior shell surface of the additively manufactured combustor shell.

4. The additively manufactured combustor shell of claim 3, wherein the support structure is located at the end of the first wall.

5. The additively manufactured combustor shell of claim 4, wherein the second wall is oriented at an angle of approximately 90° relative to the first wall.

6. The additively manufactured combustor shell of claim 5, wherein the outlet structure of the injector port further comprises a third wall extending from the first wall to the second wall, and wherein the third wall comprises a curved exterior surface.

7. The additively manufactured combustor shell of claim 4, wherein a thickness of the support structure is less than 20% of a thickness of the first wall.

8. A combustor, comprising:
   an inner combustor shell;
   an outer combustor shell radially outward of the inner combustor shell; and
   an injector port defining a fuel injection channel through the outer combustor shell, the injector port comprising:
      an outlet structure extending from a radially inward surface of the outer combustor shell; and
      a support structure extending between and contacting the outlet structure and the radially inward surface of the outer combustor shell, wherein the support structure is configured to vaporize at a temperature of 2000° Fahrenheit.

9. The combustor of claim 8, wherein the outlet structure of the injector port comprises a first wall including a first exterior surface oriented away from the fuel injection channel and a first interior surface oriented toward the fuel injection channel, and wherein the first exterior surface is oriented at an angle of between 35° and 90° relative to the radially inward surface of the outer combustor shell.

10. The combustor of claim 9, wherein a thickness of the support structure is less than 20% of a thickness of the first wall.

11. The combustor of claim 9, wherein the outlet structure of the injector port further comprises a second wall extending from an end of the first wall, the second wall including a second exterior surface oriented away from the fuel injection channel and a second interior surface oriented toward the fuel injection channel, and wherein the second exterior surface is oriented at an angle of between 35° and 90° relative to the radially inward surface of the outer combustor shell.

12. The combustor of claim 11, wherein the support structure is located along an edge of the injector port formed by the first wall and the second wall.

13. The combustor of claim 12, wherein the support structure comprises a triangular cross-section having a first height at an outlet end of the of the outlet structure and a second height less than the first height at an inlet end of the outlet structure.

14. The combustor of claim 11, wherein the outlet structure of the injector port further comprises a third wall extending from the first wall to the second wall, and wherein the third wall comprises a curved exterior surface.

15. A method of making a combustor, comprising:

locating an outer combustor shell radially outward of an inner combustor shell;

forming a support structure extending from a radially inward surface of the outer combustor shell using additive manufacturing;

forming an injector port over the support structure using additive manufacturing, the injector port defining a fuel injection channel through the outer combustor shell, wherein an outlet structure of the injector port extends from the radially inward surface of the outer combustor shell, and wherein the support structure extends between and contacts the outlet structure of the injector port and the radially inward surface of the outer combustor shell; and removing the support structure by igniting a fuel in a combustion chamber defined by the outer combustor shell and the inner combustor shell, wherein the support structure is configured to vaporize at a temperature of 2000° Fahrenheit.

16. The method of claim 15, wherein forming the injector port comprises forming a first wall of the outlet structure of the injector port at an angle of between 35° and 90° relative to the radially inward surface of the outer combustor shell.

17. The method of claim 16, wherein a thickness of the support structure is less than 20% of a thickness of the first wall.

18. The method of claim 16, wherein forming the injector port further comprises forming a second wall of the outlet structure of the injector port at an angle of between 35° and 90° relative to the radially inward surface of the outer combustor shell.

19. The method of claim 18, wherein the support structure is located at an edge of the injector port formed by the first wall and the second wall.

* * * * *